F. LUDLAM.
FLEXIBLE CONVEYER.
APPLICATION FILED APR. 1, 1918.
1,381,574. Patented June 14, 1921.
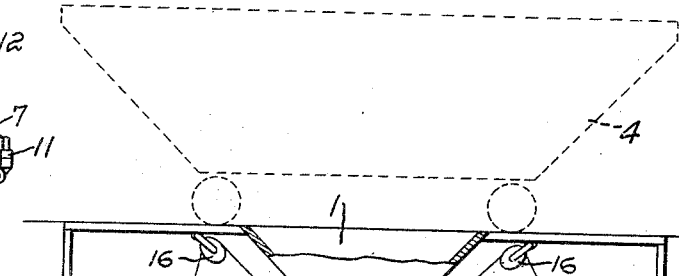
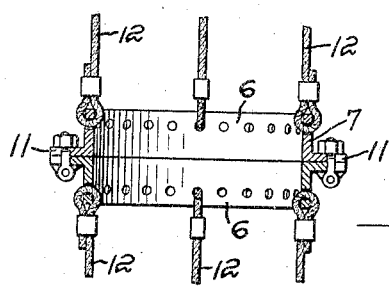
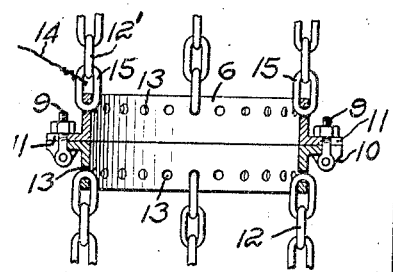
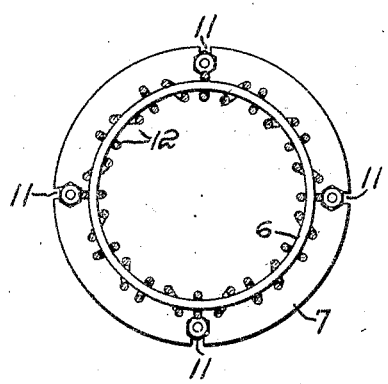
Inventor:
Frederick Ludlam,
by Emery Booth Janney Varney
Attys.

UNITED STATES PATENT OFFICE.

FREDERICK LUDLAM, OF TAUNTON, MASSACHUSETTS.

FLEXIBLE CONVEYER.

1,381,574.  Specification of Letters Patent.  Patented June 14, 1921.

Application filed April 1, 1918. Serial No. 225,864.

*To all whom it may concern:*

Be it known that I, FREDERICK LUDLAM, a citizen of the United States, and a resident of Taunton, in the county of Bristol and State of Massachusetts, have invented an Improvement in Flexible Conveyers, of which the following description, in connection with the accompanying drawings, is a specification, like characters on the drawings representing like parts.

This invention has reference to conveyer spouts or chutes and aims to provide a novel, flexible chute for conveying material of any kind along a straight or curved path and is particularly adapted for use with any material in lump form such as coal, ore, etc.

In the drawings of one embodiment of my invention described herein,

Figure 1 is a side elevation of the chute in position on a conventional form of trestle;

Fig. 2 is a cross-section on the line 2—2, of Fig. 1;

Fig. 3 is a vertical section through one of the tie or end members, part only of the chute wall being shown; and Fig. 4 is a modified form of construction.

My novel chute is shown, Figs. 1, 2, as in use in connection with a hopper 1, of any size and form of construction provided with any convenient form of chute support or suspending means, as a ring 2 of any suitable material such as iron, to which the chute may be secured as by bolts to be referred to later.

This hopper obviously may be constructed in connection with a trestle 3 or other type of elevated structure adapted to receive cars 4, Fig. 1, dotted lines, or to receive the material by means of any suitable conveying apparatus from a vessel or other source of supply.

The chute itself comprises preferably a plurality of detachable sections or units 5 of convenient length and of flexible construction, each having an end or section tie member as a ring 6, Figs. 1, 2, 3, with a lateral flange 7 on one edge thereof. The ring at one end of the section 5 is provided with the necessary number of any convenient type of locking members 9, as an eye bolt which may be pivoted to a boss 10 thereon. The ring 6 at the opposite end of the section, Fig. 3 is provided with the necessary number of coöperating locking members 11, in this case bolt receiving slots.

The wall of the chute comprises a plurality of peripherally positioned flexible members, as ropes 12, Fig. 4, or chains 12', Fig. 3, the ends of the ropes or end links of the chains being secured to the rings 6 as by extending them through the apertures 13 therein. Any other preferred form of connection may be used when desired. These chains may be of suitable size and placed as close together as desired, having in mind the use to be made of the chute.

In handling coal, for instance, much trouble and expense are now occasioned by dumping the coal from a car or conveying hopper, as the coal breaks up badly, resulting in the accumulation of large quantities of what is known in the trade as screenings, which must be sold at a very much lower price.

I have conceived the idea of preventing this breaking up of the coal when dropped from trestles, cars, etc., as is now the case, by causing it to pass through a curved chute, which acts to break the force of the fall, and this may be accomplished by bending the chute alternately to the right and left, see dotted lines, Fig. 1, to any desired degree or extent.

This may be readily accomplished by the use of guy ropes 14 secured to the sections as by rings 15 on the tie or end members 6 and carried over pulleys 16 on convenient supports, as the trestle.

By securing the sections angularly relative to each other, or zig-zag fashion as shown, obviously the path of the coal will be tortuous. Hence the contact of the coal with the alternately, angularly directed sections will slow up the speed with which the coal will pass through the chute and consequently the impact of the lumps with the pile or ground at the bottom will be so diminished that much less of the coal will be broken up. Of course, as stated, the chute sections may be given any degree of angularity within certain limits that is desired. The sharper the angles or turns in the chute the greater their effect in retarding the speed of the coal. The top section or unit may be alone suspended and moved from place to place if desired by cables 14 and pulleys 16 on the top of the trestle, and the I bolts omitted.

Furthermore by the use of my novel construction, much coal of small size that might otherwise escape through the space or path between two adjacent chains is saved. This result is effected by so suspending the chains from the section end or tie member, and the links in the same circumferential row around the chute, that an upright plane wholly within the material of the links will in one case, intercept a radial plane from the center of the chute through the center of the link at substantially a right angle, while in the case of the contiguous link such a plane will intercept a radial plane at other than a right angle.

The natural tendency of a piece of coal as it drops downwardly, if near the chute wall, to fly outwardly through the path or space between two adjacent chains where the chains are suspended uniformly from the tie member, is overcome in my novel construction by the alternate positioning of the chain links. By this construction a zig-zag path is created between adjacent chains so that the piece of coal tending to fly outwardly between the chains is more likely to strike one of the links and thus be kept from escaping. It will be obvious that if the chains were hung uniformly from the end member the longitudinal space between two adjacent chains would be of increased width opposite every other link and would thereby facilitate the escape of coal or lumps of material.

This novel chute is much less expensive to construct than the chutes of telescoping sheet sections and is much more convenient and less expensive to ship on account of its compactness when collapsed, all within the circumference of the rings 6.

It is much more flexible than a chute of sheet sections and consequently much sharper angles may be formed and a more tortuous path provided. There is a further advantage, viz., it is much more easy to repair a broken chain or rope than to repair or renew a sheet section, and is very much less noisy to use. In fact the chains seem to deaden the noise rather than to amplify it. Obviously the sections may be of any length and any diameter and they may be of any desired outline in cross-section.

If desired tie members 17 of any material, as cords, wires or chains, may be used to tie the adjoining chains together laterally to prevent spreading but I have not found the same necessary under ordinary conditions.

Obviously, when light materials are to be conveyed, ropes may be substituted for chains as in Fig. 4.

Of course when the pile of material passing through the chute reaches the lower end of the chute, the lowest unit 5 may be detached and in this way the chute shortened as desired.

Obviously many changes as to details may be made in the construction described, all within the spirit of my invention and the appended claims.

Claims.

1. A flexible chute section comprising an end member, a plurality of chains secured to the same to form a chute wall, the links in the same circumferential row of links so arranged around the chute that an upright plane wholly within the material of the link will, in one case, intercept a radial plane from the center of the chute through the center of a link at substantially a right angle; and in the case of a contiguous link such a plane would intercept a radial plane at other than a right angle.

2. A flexible chute section comprising an end member, a plurality of chains secured to the same to form a chute wall, the links in the same circumferential row of links around the chute so arranged that an upright plane wholly within the material of the link will in one case, intercept a radial plane from the center of the chute through the center of the link at substantially a right angle; and in the case of the contiguous link intercept it at other than a right angle, thus forming substantially a space of equal width between the chains to prevent escape of material; and a tie member running laterally through the chains to prevent them from spreading under outwardly directed pressure.

3. A flexible chute comprising a plurality of sections, each comprising an end member, a plurality of chains secured to the same to form a chute wall, the links in the same circumferential row of links around the chute so arranged that an upright plane wholly within the material of the link will in one case, intercept a radial plane from the center of the chute through the center of the link at substantially a right angle; and in the case of the contiguous link intercept it at other than a right angle, thus forming substantially a path of uniform width between chains to prevent escape of material; a tie member running through said chains laterally to prevent them from separating under outwardly directed pressure, in combination with means for raising and lowering the chute longitudinally, and means for flexing said chute laterally at desired points to present obstructing chute wall surfaces to retard the passage of material therethrough.

In testimony whereof, I have signed my name to this specification.

FREDERICK LUDLAM.